(12) United States Patent
Lin et al.

(10) Patent No.: US 12,472,730 B2
(45) Date of Patent: Nov. 18, 2025

(54) ARTIFICIAL LEATHER HAVING VISUAL PENETRATION AND MANUFACTURING METHOD THEREOF

(71) Applicant: SAN FANG CHEMICAL INDUSTRY CO., LTD., Kaohsiung (TW)

(72) Inventors: Chih-Yi Lin, Kaohsiung (TW);
Kuo-Kuang Cheng, Kaohsiung (TW);
Chien-Chia Huang, Kaohsiung (TW);
Tsung-Yu Tsai, Kaohsiung (TW);
Chieh Lee, Kaohsiung (TW); Wei-Ling Chen, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 0 days.

(21) Appl. No.: 17/936,105

(22) Filed: Sep. 28, 2022

(65) Prior Publication Data
US 2023/0102731 A1    Mar. 30, 2023

(30) Foreign Application Priority Data
Sep. 30, 2021    (TW) ................. 110136603

(51) Int. Cl.
*B32B 27/12*    (2006.01)
*B32B 5/02*    (2006.01)
(Continued)

(52) U.S. Cl.
CPC ............. *B32B 27/12* (2013.01); *B32B 5/028* (2013.01); *B32B 7/12* (2013.01); *B32B 27/08* (2013.01);
(Continued)

(58) Field of Classification Search
CPC ......... B32B 27/12; B32B 27/028; B32B 7/12; B32B 2037/243; B32B 2250/24; B32B 2307/40; B32B 2307/412; B32B 5/028
See application file for complete search history.

(56) References Cited

U.S. PATENT DOCUMENTS

| | | | |
|---|---|---|---|
| 4,906,516 A | 3/1990 | Okamura et al. | |
| 2012/0297643 A1* | 11/2012 | Shaffer | B32B 27/12 36/83 |

(Continued)

FOREIGN PATENT DOCUMENTS

| | | |
|---|---|---|
| CN | 103687507 A | 3/2014 |
| CN | 113544326 A | 10/2021 |

(Continued)

OTHER PUBLICATIONS

Taiwan office action and search report for counterpart application 110136603 dated May 5, 2022.

(Continued)

*Primary Examiner* — Joanna Pleszczynska
(74) *Attorney, Agent, or Firm* — WPAT, PC

(57) ABSTRACT

The present disclosure relates to an step artificial leather having visual penetration and a manufacturing method thereof. The artificial leather includes a thermoplastic substrate, a thermoplastic adhering layer, and a thermoplastic surface layer. The thermoplastic substrate has fiber net shape, and has visual penetration. The thermoplastic adhering layer is disposed on the thermoplastic substrate. The thermoplastic surface layer is disposed on the thermoplastic adhering layer. The thermoplastic surface layer and the thermoplastic adhering layer are transparent. Therefore, the artificial leather of the present disclosure has visual penetra- (Continued)

tion effect. The product made from the artificial leather of the present disclosure has attractive appearance and diversity.

5 Claims, 3 Drawing Sheets

(51) Int. Cl.
  *B32B 7/12* (2006.01)
  *B32B 27/08* (2006.01)
  *B32B 27/28* (2006.01)
  *B32B 27/36* (2006.01)
  *B32B 37/10* (2006.01)
  *B32B 37/24* (2006.01)

(52) U.S. Cl.
  CPC ............ *B32B 27/285* (2013.01); *B32B 27/36* (2013.01); *B32B 37/10* (2013.01); *B32B 37/24* (2013.01); *B32B 2037/243* (2013.01); *B32B 2250/03* (2013.01); *B32B 2250/24* (2013.01); *B32B 2255/10* (2013.01); *B32B 2262/02* (2013.01); *B32B 2262/0276* (2013.01); *B32B 2305/18* (2013.01); *B32B 2307/4023* (2013.01); *B32B 2307/412* (2013.01); *B32B 2309/02* (2013.01); *B32B 2309/12* (2013.01); *B32B 2367/00* (2013.01); *B32B 2371/00* (2013.01)

(56) References Cited

U.S. PATENT DOCUMENTS

| | | | |
|---|---|---|---|
| 2020/0048830 A1* | 2/2020 | Lin | B32B 5/26 |
| 2021/0331373 A1 | 10/2021 | Cheng | |

FOREIGN PATENT DOCUMENTS

| | | | |
|---|---|---|---|
| CN | 216545075 U | 5/2022 | |
| JP | 401272880 A | 10/1989 | |
| JP | 405044174 A | 2/1993 | |
| JP | 2014185404 A | 10/2014 | |
| JP | 2016081817 A | 5/2016 | |
| KR | 1020040055846 A | 6/2004 | |
| WO | WO 2014/132630 A1 | 9/2014 | |
| WO | WO2020195850 A1 | 10/2020 | |
| WO | WO2020244449 A1 | 12/2020 | |

OTHER PUBLICATIONS

English translation of the Taiwan search report for counterpart application 110136603 dated May 5, 2022.
Chinese Patent Office "Office Action" issued on Nov. 21, 2024, China.
Chinese Patent Office "Search report" issued on Nov. 20, 2024, China.
Chinese Patent Office "Office Action" issued on Jul. 23, 2025, China.
European Patent Office "Search Report" issued on Mar. 20, 2023, EPO.

* cited by examiner

ARTIFICIAL LEATHER HAVING VISUAL PENETRATION AND MANUFACTURING METHOD THEREOF

FIELD

The disclosure relates to an artificial leather having visual penetration and a manufacturing method thereof.

BACKGROUND

In conventional methods for manufacturing artificial leathers, a plurality of complex manufacturing processes are commonly used, and in some of the manufacturing processes, a solvent is required. The solvent is harmful to environment, and does not conform to requirements of environmental protection. In addition, conventional artificial leathers do not have visual penetration and cannot present various changes.

SUMMARY OF THE INVENTION

In accordance with one aspect of the present disclosure, an artificial leather having visual penetration includes a thermoplastic substrate, a thermoplastic adhering layer and a thermoplastic surface layer. The thermoplastic substrate is in a fiber-net shape and has visual penetration. The thermoplastic adhering layer is disposed on the thermoplastic substrate. The thermoplastic surface layer is disposed on the thermoplastic adhering layer, and the thermoplastic surface layer and the thermoplastic adhering layer are transparent.

In accordance with one aspect of the present disclosure, a manufacturing method of an artificial leather having visual penetration, includes: providing a thermoplastic substrate, the thermoplastic substrate being in a fiber-net shape and having visual penetration; disposing a thermoplastic adhering layer on the thermoplastic substrate; disposing a thermoplastic surface layer on the thermoplastic adhering layer, the thermoplastic surface layer being processed by melt-blowing, without colorant added, to be stacked to form a shielding fiber structure; combining the thermoplastic substrate, the thermoplastic adhering layer, and the thermoplastic surface layer by thermal processing; and hot-pressing the combined thermoplastic substrate, the thermoplastic adhering layer, and the thermoplastic surface layer, and the thermoplastic surface layer and the thermoplastic adhering layer being transparent.

BRIEF DESCRIPTION OF THE DRAWINGS

Aspects of the present disclosure are understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
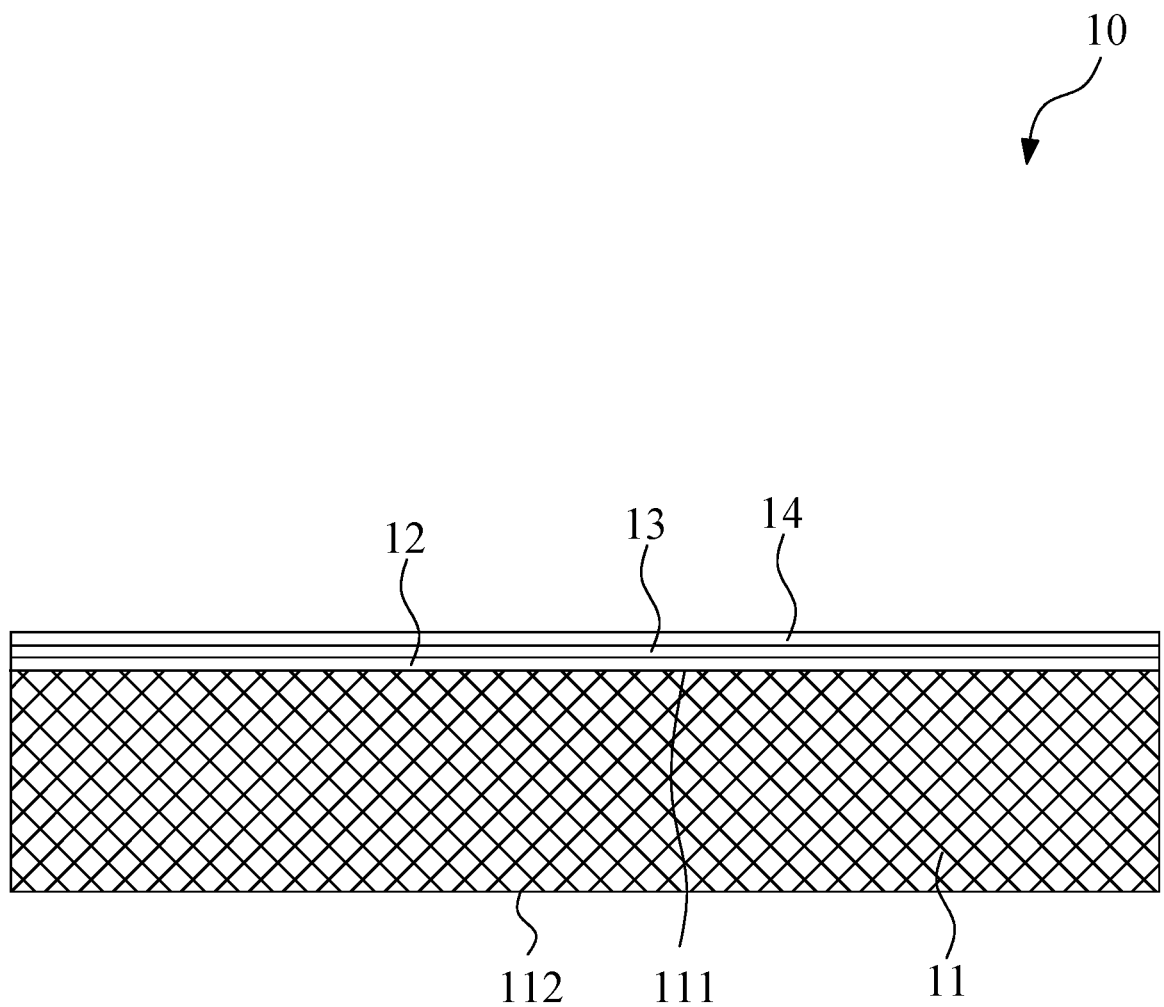
FIG. 1 is a schematic structural diagram of an artificial leather having visual penetration according to an embodiment of the present disclosure.

It is to be understood that the following disclosure provides many different embodiments or examples, for implementing different features of various embodiments. Specific examples of components and arrangements are described below to simplify the present disclosure. The present disclosure may, however, be embodied in many different forms and should not be construed as being limited to the embodiments set forth herein; rather, these embodiments are provided so that this description will be thorough and complete, and will fully convey the present disclosure to those of ordinary skill in the art. It will be apparent, however, that one or more embodiments may be practiced without these specific details.

In addition, the present disclosure may repeat reference numerals and/or letters in the various examples. This repetition is for the purpose of simplicity and clarity and does not in itself dictate a relationship between the various embodiments and/or configurations discussed.

It will be understood that when an element is referred to as being "on" another element, it can be directly on the other element or intervening elements may be present. In contrast, when an element is referred to as being "directly on" another element, there are no intervening elements present.

It will be understood that singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a schematic structural diagram of an artificial leather having visual penetration according to an embodiment of the present disclosure. In an embodiment, an artificial leather 10 having visual penetration includes: a thermoplastic substrate 11, a thermoplastic adhering layer 12, and a thermoplastic surface layer 13.

In an embodiment, the thermoplastic substrate 11 includes a first surface 111 and a second surface 112. The second surface 112 is opposite to the first surface 111. The thermoplastic substrate 11 is in a fiber-net shape and has visual penetration. In an embodiment, the thermoplastic substrate 11 has a predetermined color.

In an embodiment, the thermoplastic adhering layer 12 is disposed on the first surface 111 of the thermoplastic substrate 11.

In an embodiment, the thermoplastic surface layer 13 is disposed on the thermoplastic adhering layer 12. The thermoplastic surface layer 13 and the thermoplastic adhering layer 12 are transparent. Since the thermoplastic substrate 11 is in a fiber-net shape and has visual penetration, and the thermoplastic surface layer 13 and the thermoplastic adhering layer 12 are transparent, the artificial leather 10 in the present disclosure has visual penetration, and has an attractive appearance and diversity of products. The artificial leather 10 having visual penetration in the present disclosure can be widely applied to the fields of shoemaking, ready-made clothing, sanitary materials, etc., but is not limited to the above.

In an embodiment, the thermoplastic substrate 11, the thermoplastic adhering layer 12, and the thermoplastic surface layer 13 are made of the same material without other materials, for example, polyether or polyester, but is not limited to the above. Therefore, the artificial leather 10 having visual penetration in the present disclosure is made of the same thermoplastic material, and the artificial leather 10 having visual penetration in the present disclosure can be recycled and granulated after use, which has environmental protection benefits. In addition, recycled thermoplastic particles obtained through recycling and granulation may be added to the manufacturing process of the artificial leather 10 having visual penetration in the present disclosure, so as to further enhance the environmental protection benefits and save the manufacturing cost.

In an embodiment, the artificial leather 10 having visual penetration further includes a coating layer 14 disposed on the thermoplastic surface layer 13. The coating layer 14 has a predetermined color, and the coating layer 14 is transparent. Therefore, the artificial leather 10 having visual penetration in the present disclosure can provide abundant color designs according to the requirements of customers, to further improve the appearance and diversity of products.

Figure 2:
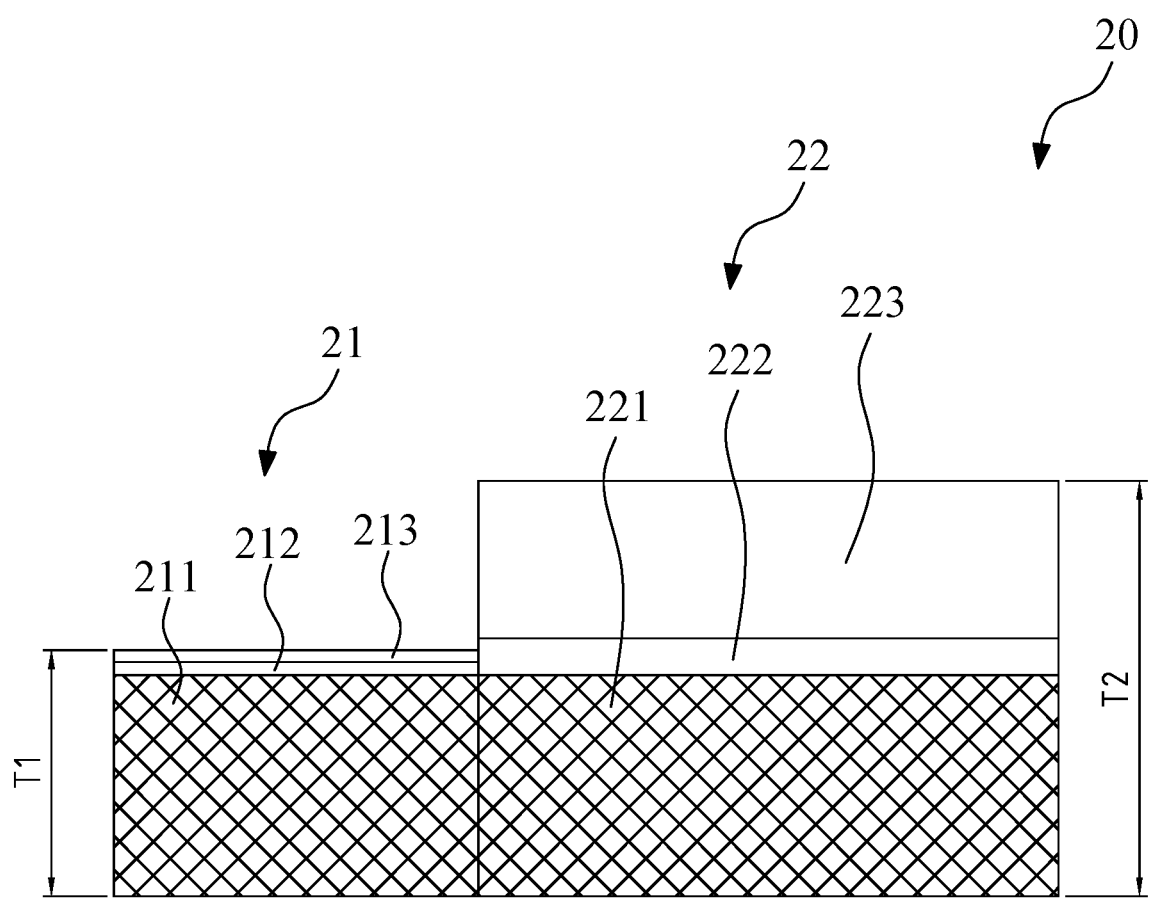
FIG. 2 is a schematic structural diagram of an artificial leather having visual penetration according to another embodiment of the present disclosure.

FIG. 2 is a schematic structural diagram of an artificial leather having visual penetration according to another embodiment of the present disclosure. In an embodiment, an artificial leather 20 having visual penetration includes: a visual penetration portion 21 and a non-visual penetration portion 22. The visual penetration portion 21 includes a thermoplastic substrate 211, a thermoplastic adhering layer 212, and a thermoplastic surface layer 213. The thermoplastic substrate 211 is in a fiber-net shape and has visual penetration. The thermoplastic surface layer 213 and the thermoplastic adhering layer 212 are transparent. Therefore, in the present disclosure, the visual penetration portion 21 of the artificial leather 20 has visual penetration. The visual penetration portion 21 has a first thickness T1. The first thickness T1 includes thicknesses of the thermoplastic substrate 211, the thermoplastic adhering layer 212, and the thermoplastic surface layer 213.

In an embodiment, the non-visual penetration portion 22 includes: an initial thermoplastic substrate 221, an initial thermoplastic adhering layer 222, and an initial thermoplastic surface layer 223. The initial thermoplastic substrate 221 is in a fiber-net shape and has visual penetration. The initial thermoplastic adhering layer 222 and the initial thermoplastic surface layer 223 are not transparent. Therefore, in the present disclosure, the non-visual penetration portion 22 of the artificial leather 20 does not have visual penetration.

In an embodiment, the non-visual penetration portion 22 has a second thickness T2 including thicknesses of the initial thermoplastic substrate 221, the initial thermoplastic adhering layer 222, and the initial thermoplastic surface layer 223. The second thickness T2 is greater than the first thickness T1. In an embodiment, the non-visual penetration portion 22 of the artificial leather 20 is not subjected to hot pressing, so that the second thickness T2 is greater than the first thickness T1; and the initial thermoplastic adhering layer 222 and the initial thermoplastic surface layer 223 are not transparent, so that the non-visual penetration portion 22 does not have visual penetration. In an embodiment, the visual penetration portion 21 of the artificial leather 20 is subjected to hot pressing, so that the first thickness T1 is less than the second thickness T2; and the thermoplastic surface layer 213 and the thermoplastic adhering layer 212 are transparent, so that the visual penetration portion 21 has visual penetration. Therefore, the artificial leather 20 in the present disclosure can meet the requirements of customization with the visual penetration portion 21 and the non-visual penetration portion 22, to further improve the contrast, appearance, and diversity of products.

Figure 3:
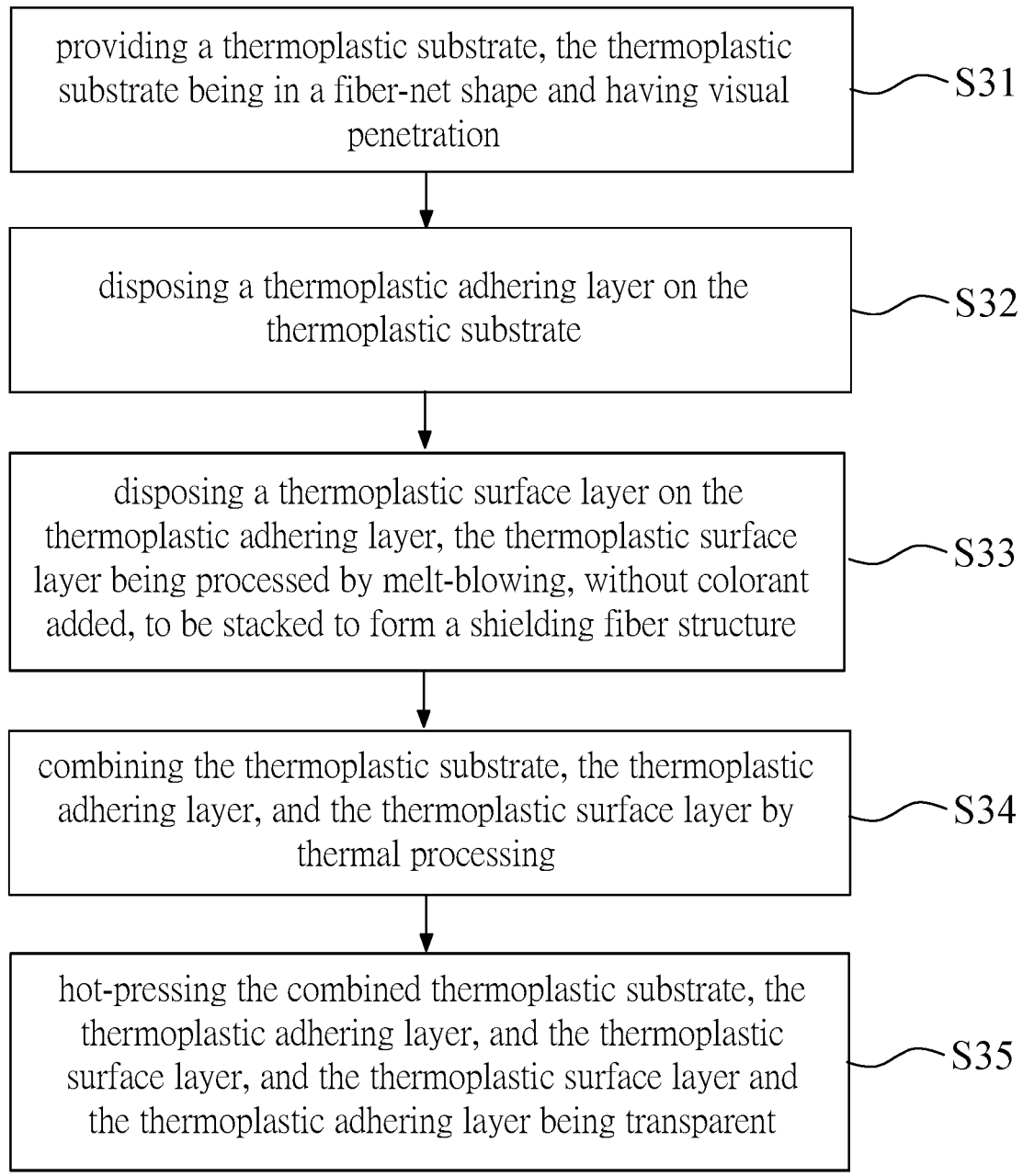
FIG. 3 is a schematic flowchart of a manufacturing method of an artificial leather having visual penetration according to an embodiment of the present disclosure.

FIG. 3 is a schematic flowchart of a manufacturing method of an artificial leather having visual penetration according to an embodiment of the present disclosure. In combination with FIG. 1 and FIG. 3, first referring to step S31, a thermoplastic substrate 11 is provided. The thermoplastic substrate 11 includes a first surface 111 and a second surface 112. The second surface 112 is opposite to the first surface 111. The thermoplastic substrate 11 is in a fiber-net shape and has visual penetration.

Referring to step S32, a thermoplastic adhering layer 12 is disposed on the first surface 111 of the thermoplastic substrate 11. In an embodiment, the thermoplastic adhering layer 12 is first prepared, and then the thermoplastic adhering layer 12 is disposed on the first surface 111 of the thermoplastic substrate 11. Referring to step S33, a thermoplastic surface layer 13 is disposed on the thermoplastic adhering layer 12. The thermoplastic surface layer 13 is processed by melt blowing, without colorant added, to be stacked to form a shielding fiber structure. In an embodiment, the thermoplastic surface layer 13 is first prepared, and then the thermoplastic surface layer 13 is disposed on the thermoplastic adhering layer 12.

Referring to step S34, the thermoplastic substrate 11, the thermoplastic adhering layer 12, and the thermoplastic surface layer 13 are combined by thermal processing to combine the thermoplastic adhering layer 12 with the thermoplastic substrate 11 and the thermoplastic surface layer 13.

Referring to step S35, the combined thermoplastic substrate 11, the thermoplastic adhering layer 12, and the thermoplastic surface layer 13 are hot-pressed, and the thermoplastic surface layer 13 and the thermoplastic adhering layer 12 are transparent.

In an embodiment, the heating temperature for hot pressing is 110-160° C. In an embodiment, the heating temperature for hot pressing is 130-140° C. In an embodiment, the pressure applied for hot pressing is 20-50 kg/cm$^2$. In an embodiment, the pressure applied for hot pressing is 30-40 kg/cm$^2$.

Therefore, the artificial leather 10 having visual penetration can be manufactured by the manufacturing method of an artificial leather having visual penetration in the present disclosure, so that products made of the artificial leather have an attractive appearance and diversity. The overall strength, such as adhesive strength or tear strength, of the artificial leather 10 in the present disclosure can be increased through manufacturing by the method of composition and hot pressing of multiple layers of thermoplastic structures. Furthermore, the thermoplastic substrate 11, the thermoplastic adhering layer 12, and the thermoplastic surface layer 13 are made of a single thermoplastic material, that is, produced from a single raw material, so that the manufacturing process and material preparation of the artificial leather having visual penetration in the present disclosure can be simplified, thereby increasing manufacturing efficiency and reducing manufacturing cost. In addition, the artificial leather 10 having visual penetration in the present disclosure can be recycled and granulated after use, which has environmental protection benefits. Moreover, recycled thermoplastic particles obtained through recycling and granulation may be added to the manufacturing process of the artificial leather 10 having visual penetration in the present disclosure, so as to further enhance the environmental protection benefits and save the manufacturing cost.

In an embodiment, after the thermoplastic surface layer is disposed, a coating layer 14 is disposed on the thermoplastic surface layer 13. During thermal processing, the thermoplastic substrate 11, the thermoplastic adhering layer 12, the thermoplastic surface layer 13, and the coating layer 14 are combined. During hot pressing, the combined thermoplastic substrate 11, the thermoplastic adhering layer 12, the thermoplastic surface layer 13, and the coating layer 14 are hot-pressed, and the thermoplastic surface layer 13, the thermoplastic adhering layer 12, and the coating layer 14 are transparent. Therefore, the artificial leather having visual penetration can provide abundant color designs according to the requirements of customers, to further improve the appearance and diversity of products.

Moreover, the scope of the present application is not intended to be limited to the particular embodiments of the process, machine, manufacture, and composition of matter, means, methods and steps described in the specification. As those skilled in the art will readily appreciate form the present disclosure, processes, machines, manufacture, compositions of matter, means, methods, or steps, presently existing or later to be developed, that perform substantially the same function or achieve substantially the same result as the corresponding embodiments described herein may be utilized in accordance with some embodiments of the present disclosure.

Accordingly, the appended claims are intended to include within their scope such processes, machines, manufacture, and compositions of matter, means, methods or steps. In addition, each claim constitutes a separate embodiment, and the combination of various claims and embodiments are within the scope of the disclosure.

What is claimed is:

1. An artificial leather having visual penetration, comprising:
    a visual penetration portion comprising:
        a thermoplastic substrate, being in a fiber-net shape and having visual penetration;
        a thermoplastic adhering layer, disposed on the thermoplastic substrate; and
        a melt-blown thermoplastic surface layer, disposed on the thermoplastic adhering layer, the thermoplastic surface layer and the thermoplastic adhering layer being transparent; and
    a non-visual penetration portion comprising:
        an initial thermoplastic substrate;
        an initial thermoplastic adhering layer disposed on the initial thermoplastic substrate, wherein a top surface of the initial thermoplastic adhering layer is higher than a top surface of the thermoplastic adhering layer of the visual penetration portion; and
        an initial melt-blown thermoplastic surface layer disposed on the initial thermoplastic adhering layer, wherein the initial melt-blown thermoplastic surface layer is free from contacting the initial thermoplastic substrate, and a thickness of the initial melt-blown thermoplastic surface layer is different from a thickness of the melt-blown thermoplastic surface layer of the visual penetration portion;
        wherein an elevation of a top surface of the thermoplastic surface layer of the visual penetration portion is between an elevation of the top surface of the initial thermoplastic adhering layer of the non-visual penetration portion and an elevation of the top surface of the thermoplastic adhering layer of the visual penetration portion.

2. The artificial leather of claim 1, wherein the thermoplastic substrate, the thermoplastic adhering layer, and the thermoplastic surface layer are made of the same material.

3. The artificial leather of claim 1, wherein the thermoplastic substrate has a predetermined color.

4. The artificial leather of claim 1, further comprising a coating layer disposed on the thermoplastic surface layer, the coating layer having a predetermined color, and the coating layer being transparent.

5. The artificial leather of claim 1, wherein the initial thermoplastic adhering layer and the initial thermoplastic surface layer are not transparent.

\* \* \* \* \*